P. C. RITCHIE.
MACHINES FOR SPREADING NETTING.

No. 177,560. Patented May 16, 1876.

Witnesses.
Otto Heifeland
Robt. E. Miller

Inventor.
Peter C. Ritchie
per
Van Santvoord & Hauff,
Attorneys

UNITED STATES PATENT OFFICE.

PETER C. RITCHIE, OF NEW YORK, N. Y.

IMPROVEMENT IN MACHINES FOR SPREADING NETTING.

Specification forming part of Letters Patent No. 177,560, dated May 16, 1876; application filed December 16, 1875.

*To all whom it may concern:*

Be it known that I, PETER C. RITCHIE, of the city, county, and State of New York, have invented a new and useful Improvement in Machines for Spreading Netting, which improvement is fully set forth in the accompanying drawing, in which—

Figure 1:
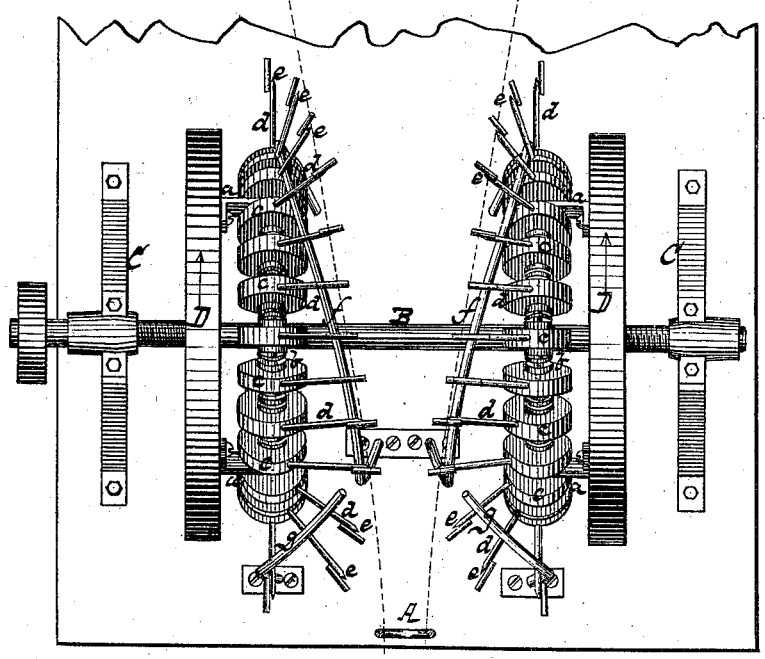
Figure 2:
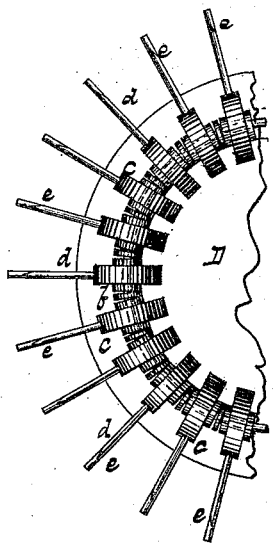
Figure 3:
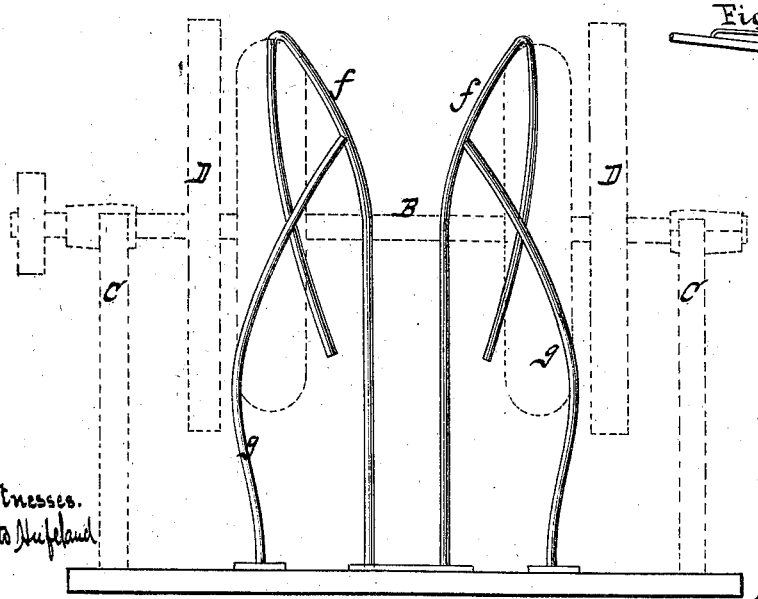
Figure 4:
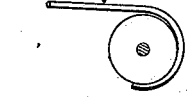
Figure 5:
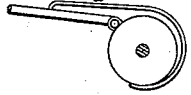

Figure 1 represents a plan or top view. Fig. 2 is a partial face view of one of speading disks. Fig. 3 is a front view of the speading-guides. Figs. 4 and 5 are modifications of the spreading-arms.

Similar letters indicate corresponding parts.

This invention relates to an improved mechanism for spreading the netting, as the same is delivered to a sizing apparatus, or for other purposes.

My invention consists in the combination of a series of oscillating spreading-arms with spreading-guides, which are arranged on the opposite sides of the feed-throat of a machine for sizing netting or other apparatus, so that the spreading-arms are caused to converge from opposite sides at a point close to the feed-throat, and after said arms have caught in the edges of the netting they are gradually forced apart, and thereby the netting is spread out to its full width, ready to be carried into the sizing apparatus.

In the drawing, the letter A designates the throat through which the netting is fed to the sizing-machine, or to any other apparatus. This throat may be made simply in the form of a ring, or it may be made in any other shape suitable to the purpose. In front of this throat is situated a shaft, B, which extends transversely to the path of the netting, and which has its bearings in standards C. A revolving motion is imparted to this shaft by a belt or any other suitable means. On this shaft are mounted two pulleys, D, at such a distance apart that the netting, when spread to its full width, can freely pass through between them. On the inner surface of each of these pulleys are secured a series of standards, *a*, which form the bearings for circular wires *b*, on each of which are mounted a series of spreading-disks, *c*, which are retained at uniform distances apart by the interposition of washers, or by any other suitable means. The disks *c* turn freely on the wires *b*, and each of them carries a radiating spreading-arm, *d*, which is provided with a sharp point, *e*. The position of said spreading-arms is determined and controlled by guides *f g*, the guides *f* serving to turn the arms gradually outward, while the guides *g* serve to turn said arms inward. These guides are stationary, while the spreading-disks, together with their arms, revolve with the shaft B and the pulleys D in the direction of the arrows marked thereon in Fig. 1. Each of the spreading-arms *d*, on coming in contact with one of the guides *g*, is turned inward, and as it rises its point catches in the edge of the netting, as the same issues from the throat A.

By the continued motion of the shaft B the arm, after having caught in the edge of the netting, is brought in contact with one of the guides *f*, and by this guide it is gradually forced outward, and by the combined action of the spreading-arms, on its opposite edges, the netting is gradually spread out to its full width, and in this condition it is delivered to the sizing apparatus. The spreading-arms, being secured to the revolving pulleys D, release the netting at the proper time automatically.

It will be noticed that, during the motion of the speading-arms, the disks *c* oscillate on the wires *b*, but it must be remarked, that said disks might be mounted firmly on the wires, and in this case the spreading-arms would be made in the form of springs, which would be pressed inward by the guides *g*, and which, after having caught in the edges of the netting, would be allowed to expand gradually, so as to spread the netting, as shown in Fig. 4; or, instead of elastic arms, rigid arms might be employed, which would be hinged to the disks *c*, and subjected to the action of springs to cause them to expand after having caught in the edges of the netting, as represented in Fig. 5.

What I claim as new, and desire to secure by Letters Patent, is—

The combination, in a machine for spreading netting, of a series of oscillating arms, mounted upon a revolving shaft for causing the spreading-arms to converge from opposite sides toward the feed-throat, and guides for distending said arms, in order to spread the netting, substantially as described.

In testimony that I claim the foregoing I have hereunto set my hand and seal this 10th day of December, 1875.

PETER C. RITCHIE. [L. S.]

Witnesses:
W. HAUFF,
E. F. KASTENHUBER.